United States Patent
Breitman et al.

(10) Patent No.: US 11,113,306 B1
(45) Date of Patent: Sep. 7, 2021

(54) METHODS AND APPARATUS FOR PERSON-CENTRIC MULTICHANNEL OPINION MINING IN DATA LAKES

(71) Applicant: EMC IP Holding Company LLC, Hopkinton, MA (US)

(72) Inventors: Karin Breitman, Rio de Janeiro (BR); Rodrigo Dias Arruda Senra, Rio de Janeiro (BR); Adriana Bechara Prado, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 465 days.

(21) Appl. No.: 15/142,429

(22) Filed: Apr. 29, 2016

(51) Int. Cl.
*G06F 16/00* (2019.01)
*G06F 16/26* (2019.01)
*G06Q 50/00* (2012.01)
*G06F 16/9535* (2019.01)

(52) U.S. Cl.
CPC .......... *G06F 16/26* (2019.01); *G06F 16/9535* (2019.01); *G06Q 50/01* (2013.01)

(58) Field of Classification Search
CPC ....... G06F 17/30; G06F 16/26; G06F 16/9535
See application file for complete search history.

(56) References Cited

U.S. PATENT DOCUMENTS

| | | | | |
|---|---|---|---|---|
| 2012/0209832 A1* | 8/2012 | Neystadt | ........... | G06F 17/30867 707/723 |
| 2013/0166540 A1* | 6/2013 | Ganesh | ............. | G06F 17/30864 707/722 |
| 2013/0179440 A1* | 7/2013 | Gordon | ................. | G06Q 10/06 707/731 |

(Continued)

OTHER PUBLICATIONS

Yu et al., "Towards answering opinion questions: Separating facts from opinions and identifying the polarity of opinion sentences," in Proc. of EMNLP, 2003, pp. 129-136.

(Continued)

*Primary Examiner* — Khanh B Pham
(74) *Attorney, Agent, or Firm* — Ryan, Mason & Lewis, LLP (57) ABSTRACT

Person-centric multi-channel opinion mining is performed in a single data repository, such as a data lake. An exemplary method comprises obtaining multi-channel heterogeneous data from a plurality of channels; identifying entities that are targets of opinion information across the plurality of channels; extracting a plurality of user identities from the plurality of channels; aligning the plurality of extracted user identities across the plurality of channels to link common user identities; identifying the entities that are targets of the opinion information of the extracted user identities; linking opinion information of the extracted user identities with a user identity associated with an opinion holder that expressed the opinion information; determining whether the opinion information comprises a positive or negative opinion; and providing a summary of the opinion information of a given opinion holder. Sentiment polarity classification algorithms optionally determine whether opinion information comprises a positive or negative opinion and assign a polarity score. An influencer score of the opinion holder is optionally assigned to the opinion information.

20 Claims, 9 Drawing Sheets

(56) References Cited

U.S. PATENT DOCUMENTS

2014/0189536 A1* 7/2014 Lange ............... H04L 67/22
 715/753
2015/0348216 A1* 12/2015 Gustafson ............. G06Q 50/01
 705/7.29

OTHER PUBLICATIONS

Read et al., "Weakly supervised techniques for domain independent sentiment classification," in Proc. of the Int. CIKM Workshop on Topic-sentiment Analysis for Mass Opinion, 2009, pp. 45-52.
G. A. Miller, "Wordnet: A lexical database for english," Communications of the ACM, vol. 38, pp. 39-41, 1995.
Dave et al., "Mining the Peanut Gallery: Opinion Extraction and Semantic Classification of Product Reviews," In Proc. Of the WWW'03, 2003.
Pang et al., "Thumbs up? Sentiment Classification Using Machine Learning Techniques," In Proc. of the EMNLP'2002, 2002.
P. Turney, "Thumbs Up or Thumbs Down? Semantic Orientation Applied to Unsupervised Classification of Reviews," In Proc. of the ACL'02, 2002.
Hu et al., "Mining and summarizing customer reviews," KDD'04, 2004.
Xiaowen et al., "A Holistic Lexicon-based Approach to Opinion Mining," WSDM '08, 2008.
Retail Banking 2020—Evolution or Revolution? Price Waterhouse Coopers—2014 accesible in pdf format at: https://www.pwc.com/gx/en/banking-capital-markets/banking-2020/assets/pwc-retail-banking-2020-evolution-or-revolution.pdf.
Halevy et al., "The Unreasonable Effectiveness of Data," in Intelligent Systems, IEEE, vol. 24, No. 2, pp. 8-12, Mar.-Apr. 2009.
Hatzivassiloglou et al., "Effects of adjective orientation and gradability on sentence subjectivity," in Proc. of the 18th Conf. on Computational Linguistics, 2000, pp. 299-305.

* cited by examiner

METHODS AND APPARATUS FOR PERSON-CENTRIC MULTICHANNEL OPINION MINING IN DATA LAKES

FIELD

The invention relates generally to opinion mining techniques, and, more particularly, to opinion mining techniques using heterogeneous multi-channel data.

BACKGROUND

Business models have changed dramatically in the past decade. The advent of the Internet, and particularly the appearance of additional digital channels, such as mobile and social media channels, have changed the execution of the retail mix and, more importantly, shopper behavior. Business experts advocate a seamless, multiple channel world where customers can shop across all of the channels in which businesses relate to their customers (such as Internet, mobile, radio, brick and mortar, print media and call center channels), anywhere, any time, and from any device. Multiple channel business models are common, for example, in retail operations, banking and telecommunications.

Nevertheless, the information obtained from separate channels is often viewed as problematic because the information is typically kept in distinct repositories or databases, thus contributing to a distributed and fragmented view of the customer. In addition, the information obtained from separate channels varies greatly from channel to channel, given the differences in interaction promoted by each channel. Although a number of techniques have been proposed or suggested to reconcile different channels using business intelligence (BI) technology, the inherent difficulties related to heterogeneous data integration yield poor results. See, for example, "Retail Banking 2020—Evolution or Revolution?," Price Waterhouse Coopers (2014). In addition, such techniques typically consider only past results, and do not possess real time capabilities.

Opinion Mining techniques typically employ text mining, natural language processing and computational linguistics to analyze information from opinionative data sources. An opinion can be defined by the identification of two elements in a document, namely, the target of the opinion and the sentiment (e.g., positive, negative, or neutral) expressed about this target. The target of the opinion is an entity that is referenced in the opinion itself. An entity can be, for example, an object, a person, a product or a company, or any characteristic thereof. For example, in the statement "Company A provides a very good service," a positive sentiment is being expressed with respect to a characteristic of a company (service). The "service of Company A" is the entity (or target) of this opinion. Existing Opinion Mining approaches aim to identify and classify (as positive, negative, or neutral) the opinions on a particular target, regardless of who expresses such opinions.

A need remains, however, for techniques for aggregating disparate channel information in a multi-channel data lake, and for performing person-centric multi-channel opinion mining using the data lake.

SUMMARY

Illustrative embodiments of the present invention provide methods and apparatus for person-centric multi-channel opinion mining in a single data repository, such as a data lake. In one exemplary embodiment, a method comprises the steps of obtaining multi-channel heterogeneous data from a plurality of channels; identifying one or more entities that are targets of opinion information across the plurality of channels; extracting a plurality of user identities from the plurality of channels; aligning the plurality of extracted user identities across the plurality of channels to link common user identities; identifying one or more of the entities that are targets of the opinion information of the extracted user identities; linking the opinion information of the extracted user identities with a user identity associated with an opinion holder that expressed the opinion information; determining whether the opinion information of the opinion holder comprises one or more of a positive opinion and a negative opinion; and providing a summary of the opinion information of a given opinion holder associated with a given linked common user identity across the plurality of channels.

In one or more embodiments, a sentiment polarity classification algorithm can determine whether the opinion information comprises a positive opinion or a negative opinion. A polarity score can optionally be assigned to the opinion information. An influencer score of the given opinion holder is optionally associated with the opinion information.

In at least one embodiment, the multi-channel heterogeneous data from the plurality of channels is aggregated into a single data repository, such as a data lake.

As noted above, illustrative embodiments described herein provide significant improvements relative to conventional opinion mining systems by performing person-centric opinion mining on the data in the data lake. These and other features and advantages of the present invention will become more readily apparent from the accompanying drawings and the following detailed description.

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for person-centric multi-channel opinion mining in a single data repository, such as a data lake. While aspects of the present invention are illustrated in a retail environment, the present invention can be employed in any multi-channel environment that seeks to obtain the opinions of its customers.

In one or more embodiments of the invention, person-centric multi-channel opinion mining extracts the attitudes of a particular opinion holder with respect to a plurality of entities, taking into consideration disparate data sources from heterogeneous channels. Heterogeneous channels increase the relevant amount of opinionative information, allowing for a comprehensive understanding about the likes and dislikes of the opinion holder.

The disclosed exemplary person-centric multi-channel opinion mining techniques evaluate the opinions of a given person (the opinion holder) with respect to a plurality of entities, rather than simply analyzing what is being said about a specific entity, regardless of who is expressing the opinions. In this manner, businesses, such as retail, banking and telecommunication companies, can profile customers and provide customer-centric businesses.

Person-Centric Opinion Mining

As noted above, existing Opinion Mining approaches typically focus on mining homogeneous data sources (e.g., product reviews) to identify and classify the sentiment of the opinions regarding a particular entity, regardless of the opinion holders.

Figure 1:
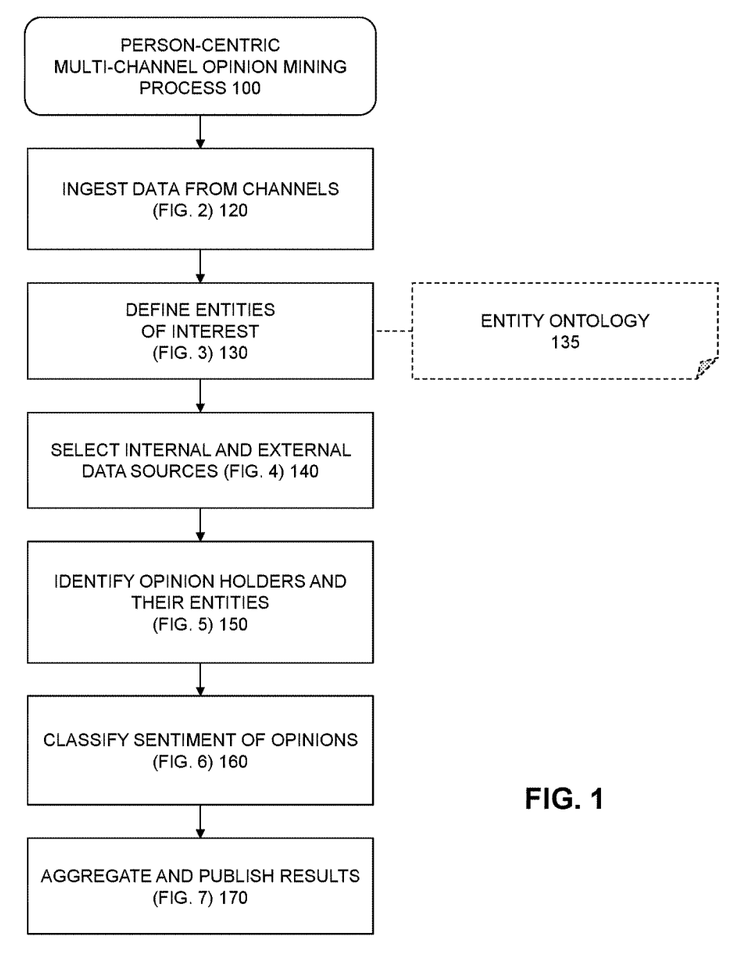
FIG. 1 is a flow chart illustrating an exemplary implementation of a person-centric multi-channel opinion mining process, according to one embodiment of the invention.

FIG. 1 is a flow chart illustrating an exemplary implementation of a person-centric multi-channel opinion mining process 100, according to one embodiment of the invention. As shown in FIG. 1, the exemplary person-centric multi-channel opinion mining process 100 initially ingests data from a plurality of channels into a data lake or another data repository during step 120, as discussed further below in conjunction with FIG. 2. Generally, heterogeneous datasets are ingested into a data lake in order to increase the amount of available opinionative information, allowing for a comprehensive understanding about the likes and dislikes of a particular opinion holder. The availability of such a large corpus of data enables the disclosed person-centric opinion mining to summarize the opinions about a large number of opinion holders with respect to a large number of entities.

During step 130, the exemplary person-centric multi-channel opinion mining process 100 defines entities of interest, as discussed further below in conjunction with FIG. 3, optionally, using an Entity Ontology 135. In other words, the entities (i.e., targets) for which opinions should be collected are identified during step 130. There are several options as to how to identify the topics of interest, ranging from a manual process (e.g., where the user defines what he or she is interested in), to the use of algorithms to help the identification of trending topics, to the use of a pre-computed ontology 135 that defines the entities of interest, their relationships, as well as semantics.

The exemplary person-centric multi-channel opinion mining process 100 selects internal and external data sources to consider during step 140, as discussed further below in conjunction with FIG. 4. Step 140 may select the relevant internal data sources, for example, using existing techniques to profile, sort, rank, sample and summarize available data sources. External data sources include, for example, social media sources, media outlets, industry blogs and influencer rating networks, such as the Klout™ web site and application. Influencer ratings use social media analytics to rank users using a numerical value according to online social influence. In addition, for each source, the relevant information can also be identified. For example, for the Twitter™ online service, #hashtags, @mentions, keywords, stream history or the full data can be considered.

During step 150, the exemplary person-centric multi-channel opinion mining process 100 identifies the opinion holders and their entities of interest, as discussed further below in conjunction with FIG. 5. The entities of interest indicate the entities to which a particular opinion holder refers to in one or more selected data sources. This assumes the ability to segment channel data sources so as to identify opinion holders in an unambiguous fashion. As discussed further below, a plurality of user identities across a plurality of channels can be aligned to link common user identities under a single identifier. In one or more embodiments, channel-specific heuristics can extract an opinion holder from a channel and identify the same opinion holder expressing his or her opinion in another channel. In addition, other information about the opinion holders can be linked to them, such as their influencer score or rating.

Figure 6:
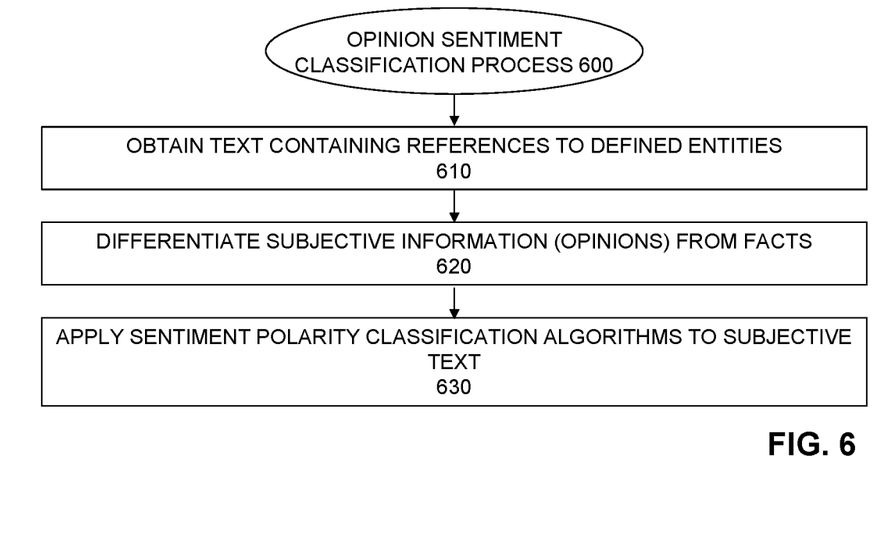
FIG. 6 is a flow chart illustrating an exemplary implementation of an opinion sentiment classification process, according to one embodiment of the invention.

The exemplary person-centric multi-channel opinion mining process 100 proceeds to classify the sentiment of extracted opinions during step 160, as discussed further below in conjunction with FIG. 6. Step 160 differentiates subjective information and objective information (that is, facts). This can be done, for example, by assuming that text with adjectives are subjective text, since adjectives are already acknowledged as being good indicators of subjectivity. Thereafter, sentiment polarity classification algorithms are applied to the identified subjective text to determine whether each opinion is positive, negative or neutral.

Finally, during step 170, the exemplary person-centric multi-channel opinion mining process 100 aggregates and publishes the results, as discussed further below in conjunction with FIG. 7.

Figure 2:
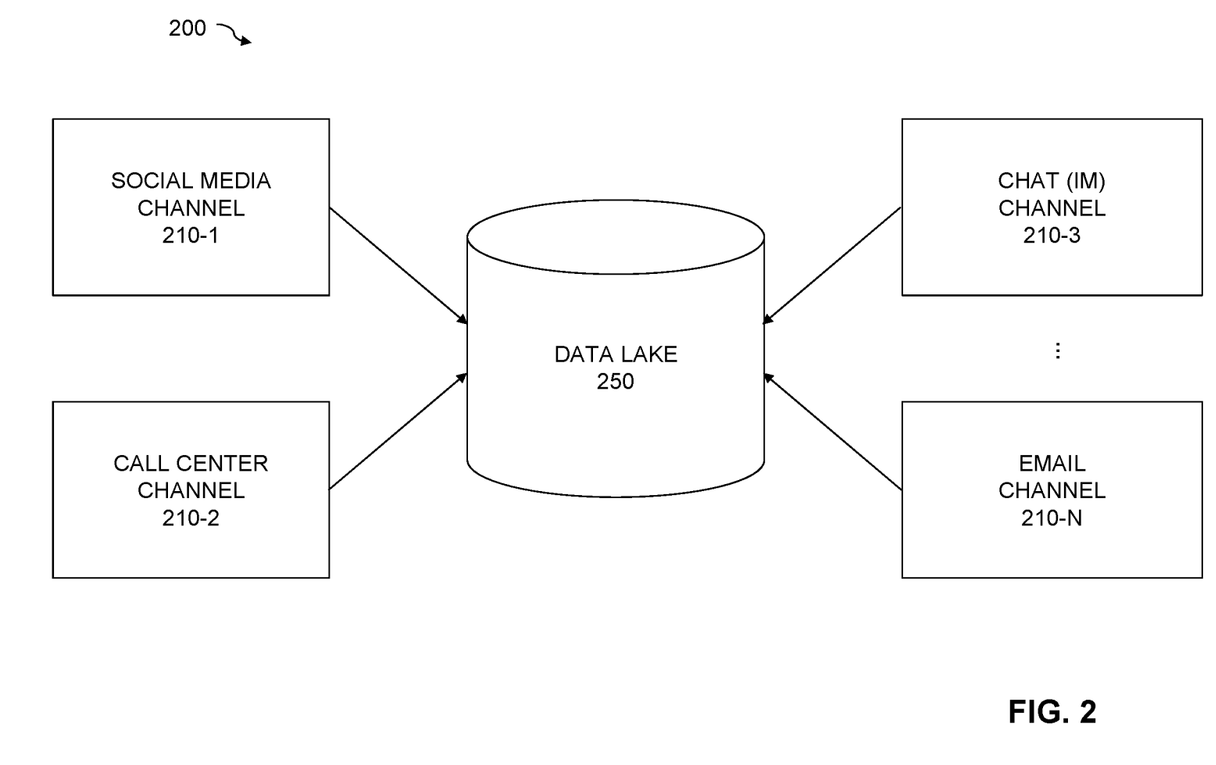
FIG. 2 illustrates a plurality of channels ingested into a multi-channel data lake.

As noted above, the exemplary person-centric multi-channel opinion mining process 100 of FIG. 1 ingests data from a plurality of channels into a data lake or another data repository during step 120. FIG. 2 is a diagram 200 of a plurality of channels 210-1 through 210-n ingested into a multi-channel data lake 250. In the exemplary embodiment of FIG. 2, the channels comprise, for example, one or more social media channels 210-1, one or more call center channels 210-2, one or more chat (e.g., instant messaging) channels 210-3, and one or more email channels 210-n. The exemplary data lake 250 provides access to data and the ability to integrate disparate information sources in a secure, unambiguous, and coordinated way. Each source channel 210 is typically characterized by a set of information flows. For example, an Internet channel typically comprises transaction history, click streams, comments, and behavioral analysis (e.g., duration and frequency of visits, choices made, and response to online offers).

The ability to access very large quantities of heterogeneous data sources promoted by the multi-channel data lake 250 enables a more holistic view of, e.g., customer and product data, as well as to serve as fuel to more sophisticated algorithmic analysis. In addition, the multi-channel data lake 250 enables evaluation of more sophisticated concepts (referred to herein as entities) and what is being said about them. For example, the confidence of any sentiment classification can be increased given that opinions can be confirmed using the various source channels. Additionally, sarcasm and irony related to any entities can be discarded if the source channel is known to be prone to such type of behavior. This promotes a more comprehensive understanding of the likes and dislikes of opinion holders.

The data lake 250 may be aggregated in a single physical location or distributed across a plurality of storage nodes, as would be apparent to a person of ordinary skill in the art.

As noted above, during step 130, the exemplary person-centric multi-channel opinion mining process 100 of FIG. 1 defines entities of interest. FIG. 3 is a flow chart illustrating an exemplary implementation of an entity definition process 300, according to one embodiment of the invention. During step 310, the exemplary entity definition process 300 manually and/or automatically identifies the topics (e.g., entities of interest) where opinions should be obtained. Thereafter, the exemplary entity definition process 300 optionally obtains a pre-computed ontology 135 (FIG. 1) defining entities of interest and their relationships, during step 320.

In this manner, the exemplary entity definition process 300 provides several options as to how to identify the topics of interest, ranging from a manual process (e.g., where the user defines what he or she is interested in), to the use of algorithms to help the identification of trending topics, to the use of the pre-computed ontology 135 that defines the entities of interest, their relationships, as well as semantics.

The exemplary person-centric multi-channel opinion mining process 100 of FIG. 1 selects internal and external data sources to consider during step 140.

Figure 4:
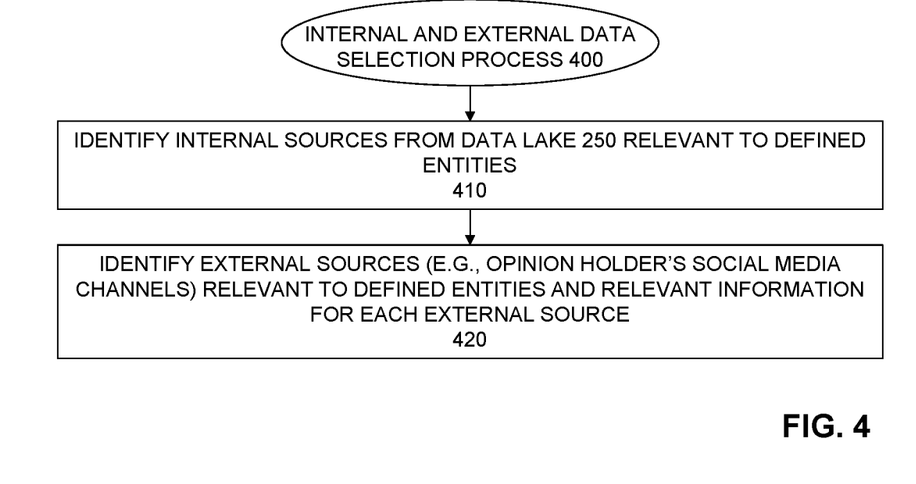
FIG. 4 is a flow chart illustrating an exemplary implementation of an internal and external data selection process, according to one embodiment of the invention.

FIG. 4 is a flow chart illustrating an exemplary implementation of an internal and external data selection process 400, according to one embodiment of the invention. The exemplary internal and external data selection process 400 identifies the internal sources from the data lake 250 during step 410 that are relevant to the entities of interest defined during step 130. The relevant internal data sources may be selected during step 410, for example, using existing techniques to profile, sort, rank, sample and summarize available data sources.

In one or more embodiments, the selection of internal sources is guided by intelligence that can come from people at the task, and/or with the aid of algorithms capable of profiling and sampling data sources so as to determine their adherence to the named entities in question. The process can be executed on the ensemble of data sets, with the eventual waste of computational effort spent on data sources that were not relevant to the named entities in question.

During step 420, the exemplary internal and external data selection process 400 identifies external sources (e.g., opinion holder's social media channels) relevant to the defined entities, and relevant information for each external source. External data sources include, for example, social media sources (such as Facebook™, Twitter™, Pinterest™ and Instagram™ social media sources), media outlets, industry blogs and influencer rating networks, such as the Klout™ web site and application. Influencer ratings use social media analytics to rank users using a numerical value according to online social influence. In addition, for each source, the relevant information can also be identified. For example, for the Twitter™ online service, #hashtags, @mentions, keywords, stream history or the full data can be considered.

As noted above, during step 150, the exemplary person-centric multi-channel opinion mining process 100 of FIG. 1 identifies the opinion holders and their entities of interest. FIG. 5 is a flow chart illustrating an exemplary implementation of an opinion holders and entities identification process 500, according to one embodiment of the invention. The entities of interest indicate the entities to which a particular opinion holder refers to in one or more selected data sources.

Figure 5:
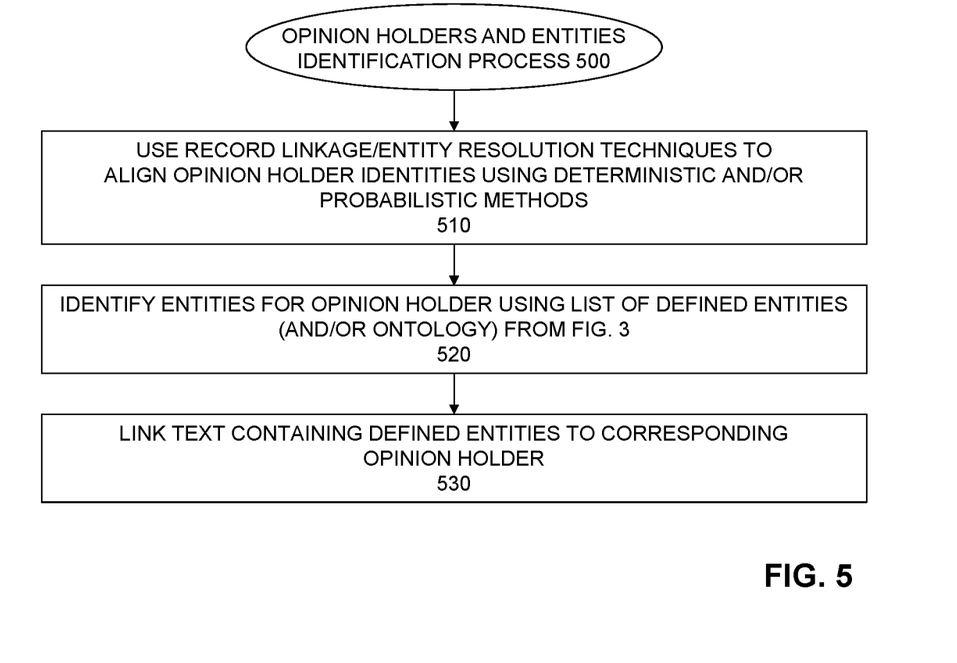
FIG. 5 is a flow chart illustrating an exemplary implementation of an opinion holders and entities identification process, according to one embodiment of the invention.

As shown in FIG. 5, the exemplary opinion holders and entities identification process 500 initially uses record linkage/entity resolution techniques to align opinion holder identities using deterministic and/or probabilistic methods, during step 510. For example, channel-specific heuristics or patterns can be employed to extract identities from each channel and align identities across channels. For example, for each channel 210, fields can be identified that correspond to user ID. Other meta information fields for disambiguation and identity reconciliation are also optionally gathered. For example, the user identity for the Facebook™ channel can be alternatively expressed, as follows:

Name: John Smith
Birthdate: Jan. 1, 1970
E-mail: john.smith@work.com

Similarly, the user identity for the Twitter™ channel can be alternatively expressed, as follows:

Twitter username: jsmith42
Name: Smith, John
E-mail: jsmith@aboutme.com

In this manner, a plurality of user identities across a plurality of channels are aligned to link common user identities under a single identifier. In one or more embodiments, channel-specific heuristics can extract an opinion holder from a channel and identify the same opinion holder expressing his or her opinion in another channel. In addition, other information about the opinion holders can be linked to them, such as their influencer score.

Figure 3:
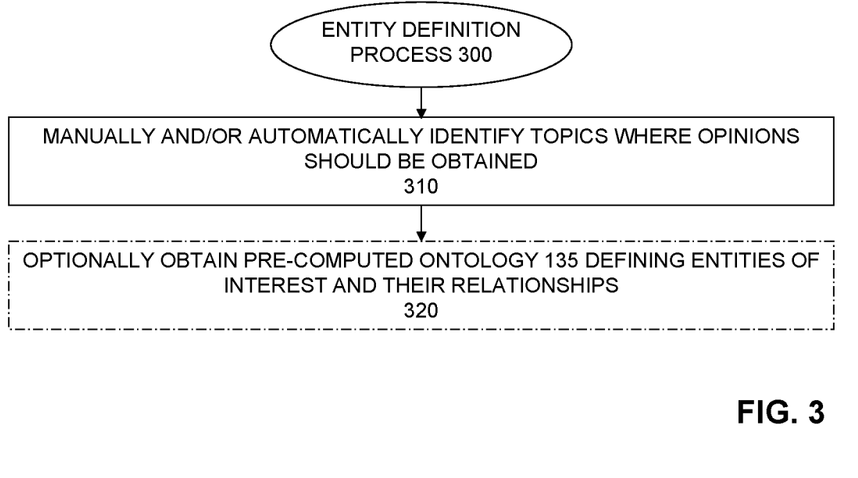
FIG. 3 is a flow chart illustrating an exemplary implementation of an entity definition process, according to one embodiment of the invention.

During step 520, the exemplary opinion holders and entities identification process 500 identifies entities for a given opinion holder using the list of defined entities (and/or ontology 135) from FIG. 3. In other words, the entities that have been reviewed by a given opinion holder are identified.

Finally, during step 530, the text containing defined entities is linked to the corresponding opinion holder.

As noted above, the exemplary person-centric multi-channel opinion mining process 100 of FIG. 1 proceeds to classify the sentiment of extracted opinions during step 160. FIG. 6 is a flow chart illustrating an exemplary implementation of an opinion sentiment classification process 600, according to one embodiment of the invention. Generally, the exemplary opinion sentiment classification process 600 differentiates subjective information and objective information and applies one or more sentiment polarity classification algorithms to classify the subjective text.

The exemplary opinion sentiment classification process 600 initially obtains text from the data lake 250 containing references to the defined entities during step 610. Thereafter, the exemplary opinion sentiment classification process 600 differentiates between subjective information (opinions) and facts during step 620. This can be done, for example, by assuming that text with adjectives are subjective text, since adjectives are already acknowledged as being good indicators of subjectivity.

Finally, the exemplary opinion sentiment classification process 600 applies one or more sentiment polarity classification algorithms to the identified subjective text during step 630, as discussed hereinafter in the Section entitled "Sentiment Polarity Classification," to determine whether each opinion is positive, negative or neutral.

Sentiment Polarity Classification

As noted above, Opinion Mining is the problem of identifying the expressed opinions on a particular target and classifying the polarity of these opinions, as carrying a positive, negative, or neutral connotation.

The classification step can classify (i) the overall sentiment of a document, where it is assumed that the document contains opinions of one specific person with respect to a single known target, such as a product; (ii) individual sentences, where each sentence contains just one opinion and that the referred targets are known; and/or (iii) an overall sentiment toward specific characteristics of a given known target, such as a product.

Sentiment classification can be performed using machine learning techniques, lexicon-based approaches and/or statistical methods, each discussed below. For a more detailed discussion of sentiment classification techniques, see, for example, Bing Liu, "Sentiment Analysis: Mining Opinions, Sentiments, and Emotions," Cambridge University Press, 2015, incorporated by reference herein in its entirety.

A. Supervised Machine Learning Techniques

To classify the sentiment polarity of a given piece of text, the idea is to train a classifier (e.g., Support Vector Machine (SVM) or naive Bayes classifier) based on the characteristics of pieces of text (e.g., reviews), whose sentiment polarities are already known. In a training dataset, each piece of text is often represented as a binary feature vector, in which each entry takes a binary value of one if, e.g., a given word (or unigram) is present in the document and a binary value of zero, otherwise. Such feature vector may also contain entries referring to, e.g., Part-Of-Speech tags, as a means to help with the word-sense disambiguation problem. For a more detailed discussion of suitable machine learning techniques, see, for example, K. Dave et al., "Mining the Peanut Gallery: Opinion Extraction and Semantic Classification of Product Reviews," Proc. of the WWW'03 (2003), and/or B. Pang et al., "Thumbs Up? Sentiment Classification Using Machine Learning Techniques," Proc. of the EMNLP'2002 (2002), each incorporated by reference herein in its entirety.

B. Lexicon-Based Approaches

Lexicon-based approach methods rely on the observation that semantically close words may share the same polarity (e.g., all synonyms of the word "excellent" may have a positive connotation). For a discussion of suitable lexicon-based approaches, see, for example, M. Hu and B. Liu, "Mining and Summarizing Customer Reviews," KDD'04 (2004); and/or D Xiaowen et al., "A Holistic Lexicon-based Approach to Opinion Mining," WSDM '08 (2008), each incorporated by reference herein in its entirety. M. Hu and B. Liu classify review sentences by first selecting 30 words whose polarities are manually labeled (classified) by them, frequently referred to as seed words in the literature. Then, this set of seed words is extended, iteratively, with their synonyms and antonyms (e.g., using the WordNet™ lexical resource), as a means to classify the polarity of the adjectives present in the sentences. The dominant polarity of the adjectives is then considered as the polarity of the overall sentence.

C. Statistical Methods

Differently from the machine learning and lexicon-based methods, statistical methods (also referred to as Corpus-based methods) do not train a model to classify unlabeled text nor rely on semantic relations. Statistical methods are based on word frequencies and, in particular, mutual information between words (or phrases) and special words, called paradigm words, whose polarities are known beforehand. The mutual information is often computed using statistics gathered by a search engine or from large corpora. For a more detailed discussion of suitable statistical methods, see, for example, J. Read and J. Carroll, "Weakly Supervised Techniques for Domain Independent Sentiment Classification," Proc. of the Int'l CIKM Workshop on Topic-Sentiment Analysis for Mass Opinion, 45-52 (2009); and/or P. Turney, "Thumbs Up or Thumbs Down? Semantic Orientation Applied to Unsupervised Classification of Reviews," Proc. of the ACL'02 (2002), each incorporated by reference herein in its entirety.

For example, in Turney's precursor work, he classifies different sorts of reviews by (i) first, extracting two-word phrases from the reviews' text, which are chosen via a number of Part-Of-Speech patterns, (ii) computing the polarity score, also referred to as semantic orientation, of each phrase as its mutual information with the positive paradigm word "excellent" minus its mutual information with the negative paradigm word "poor", and (iii) finally, averaging the obtained polarity scores to determine the final polarity of the review. If the average is positive, then the review is considered as positive, being negative otherwise.

Results

As noted above, during step 170, the exemplary person-centric multi-channel opinion mining process 100 of FIG. 1 aggregates and publishes the results. FIG. 7 is a flow chart illustrating an exemplary implementation of an opinion aggregation and presentation process 700, according to one embodiment of the invention.

Figure 7:
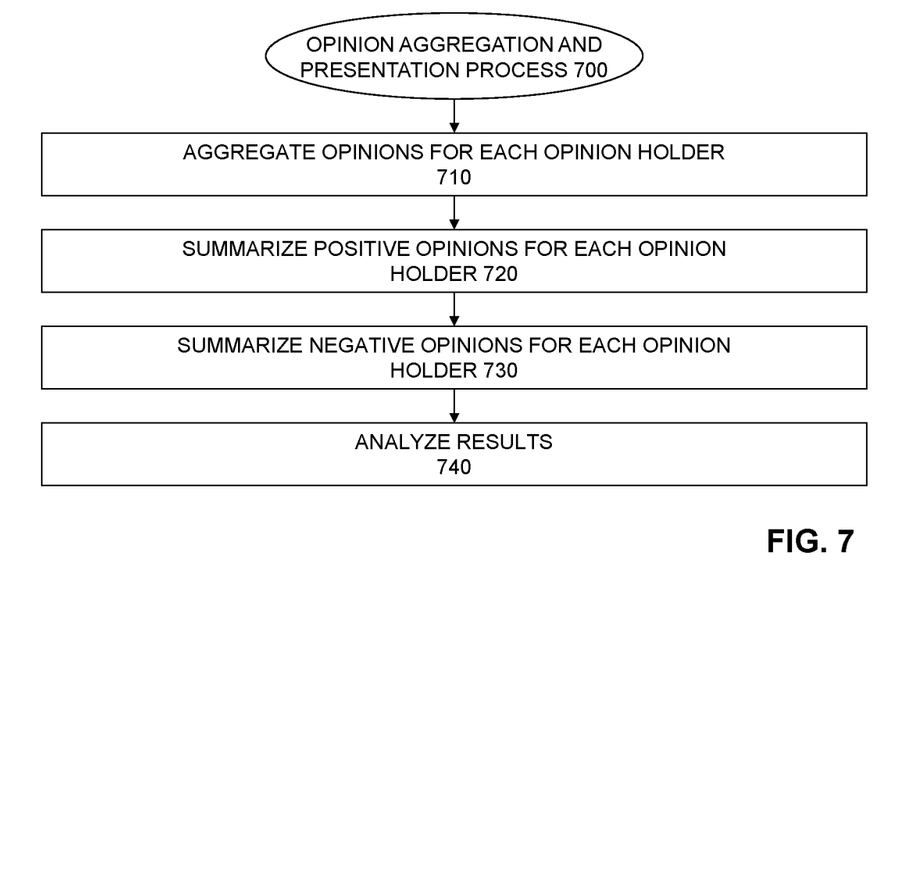
FIG. 7 is a flow chart illustrating an exemplary implementation of an opinion aggregation and presentation process, according to one embodiment of the invention.

As shown in FIG. 7, the exemplary opinion aggregation and presentation process 700 initially aggregates the opinions for each opinion holder during step 710. The positive opinions for each opinion holder are summarized during step 720 and the negative opinions for each opinion holder are summarized during step 730.

Finally, the results are analyzed during step 740. Generally, for each identified person, a summary of his or her likes and dislikes are provided, as well as optionally other characteristics, such as his or her influencer score, such as a Klout™ score. The results can be employed, for example, for customer profiling, segmentation, and the creation of flexible and agile product portfolios adapted and personalized to their customer base.

As data sources in multiple channels are continuously growing, the exemplary person-centric multi-channel opinion mining process 100 of FIG. 1 is optionally repeated, as a means to identify new relevant entities, as well as new opinion holders. Since opinions of a given opinion holder with respect to a given entity may change from time to time or may be continuously reinforced, one may store the sentiment history about each of the opinion holders for further analysis. For example, one can look for a recurrence of bad opinions about a specific entity of interest.

EXAMPLES

Example 1

Suppose a Telecom Company wants to profile their customers and understand what the customers are talking about with respect to the company's services in different communication channels. The company can build a system based on the disclosed architecture to gather information from sources such as the company's Twitter™ stream, Facebook™ page and received e-mails in order to identify customers of interest. The system can cross-reference the opinions mined from these sources with any opinion the customers have expressed about the company through other channels, such as the customer's own Twitter™ streams, Facebook™ pages, blogs and so on. Actions related to those customers could then be taken by, e.g., the analysis of the customer's influencer score. If a particular customer seems pretty satisfied with the company and often expresses positive opinions about it, the company could, for example, create directed marketing initiatives, so that the customer influences his or her social media contacts in a positive way. On the other hand, if a customer is dissatisfied with the company, he or she could negatively influence his or her social media contacts, potentially increasing the risk of customer churn. The company could then pro-actively contact those dissatisfied customers to understand their needs and create special communication channels to improve the relationship between the company and the unhappy customers.

Example 2

The extraction of the opinion holders and their entities during step 150, as discussed in conjunction with FIG. 5, can be leveraged to, e.g., create clusters of customers expressing opinions about related entities. A bank could use such information to create marketing campaigns that promote more aggressive investment options to customers that frequently express opinions about stocks and bonds. An online book shop could try to sell certain types of books to clusters of customers that more often express opinions about novels, detective books, horror stories, cooking, etc.

CONCLUSION

In one or more embodiments, a methodology is provided for Opinion Mining using a multi-channel data lake 250, capable of aggregating, in a single location, a large corpora of information. The availability of large quantities of heterogeneous data permitted by the multi-channel data lake 250 extends beyond capabilities of existing Opinion Mining approaches, which are typically focused on mining homogeneous data sources (e.g., product reviews) to identify and classify (as positive, negative, or neutral) the opinions on a particular target (e.g., a product or a characteristic of a product), regardless of the opinion holders.

The disclosed person-centric multi-channel opinion mining approach extracts the attitude of each opinion holder with respect to a large number of entities, taking into consideration heterogeneous data sources of different nature, such as e-mail, call center, and mobile data. Heterogeneous channels increase the relevant amount of opinionative information, allowing for a holistic view about the likes and dislikes of each opinion holder. In other words, in one or more embodiments, the focus is on what is being said by a given person with respect to a large number of heterogeneous entities, rather than simply analyzing what is being said about a specific entity, regardless of who is expressing the opinions.

In this manner, businesses, such as retail, banking and telecommunication companies, can more effectively profile customers using a customer-centric business model.

The foregoing applications and associated embodiments should be considered as illustrative only, and numerous other embodiments can be configured using the techniques disclosed herein, in a wide variety of different applications.

It should also be understood that the person-centric multi-channel opinion mining techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The person-centric multi-channel opinion mining techniques may be implemented using one or more processing platforms. One or more of the processing modules or other components may therefore each run on a computer, storage device or other processing platform element. A given such element may be viewed as an example of what is more generally referred to herein as a "processing device."

Figure 8:
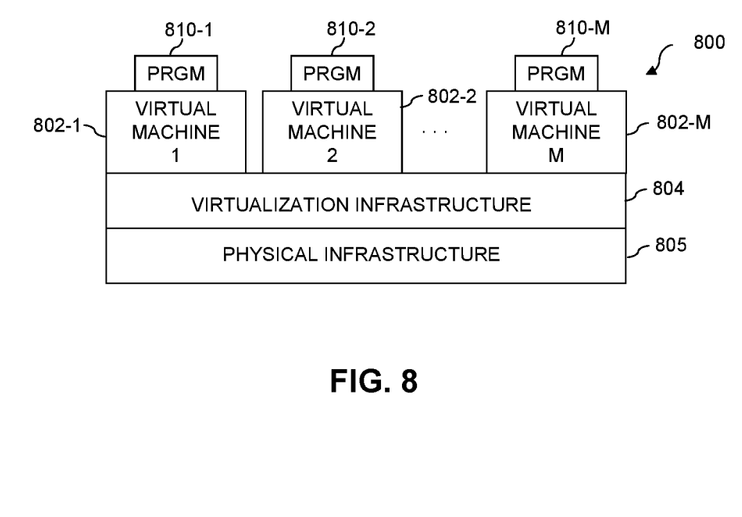
FIG. 8 illustrates an exemplary processing platform that may be used to implement at least a portion of one or more embodiments of the invention comprising a cloud infrastructure.

Referring now to FIG. 8, one possible processing platform that may be used to implement at least a portion of one or more embodiments of the invention comprises cloud infrastructure 800. The cloud infrastructure 800 in this exemplary processing platform comprises virtual machines (VMs) 802-1, 802-2, . . . 802-M implemented using a hypervisor 804. The hypervisor 804 runs on physical infrastructure 805. The cloud infrastructure 800 further comprises sets of applications 810-1, 810-2, . . . 802-M running on respective ones of the virtual machines 802-1, 802-2, . . . 802-M under the control of the hypervisor 804.

The cloud infrastructure 800 may encompass the entire given system or only portions of that given system, such as one or more of client, servers, controller, authentication server or relying server in the system.

Although only a single hypervisor 804 is shown in the embodiment of FIG. 8, the system may of course include multiple hypervisors each providing a set of virtual machines using at least one underlying physical machine.

An example of a commercially available hypervisor platform that may be used to implement hypervisor 804 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 9:
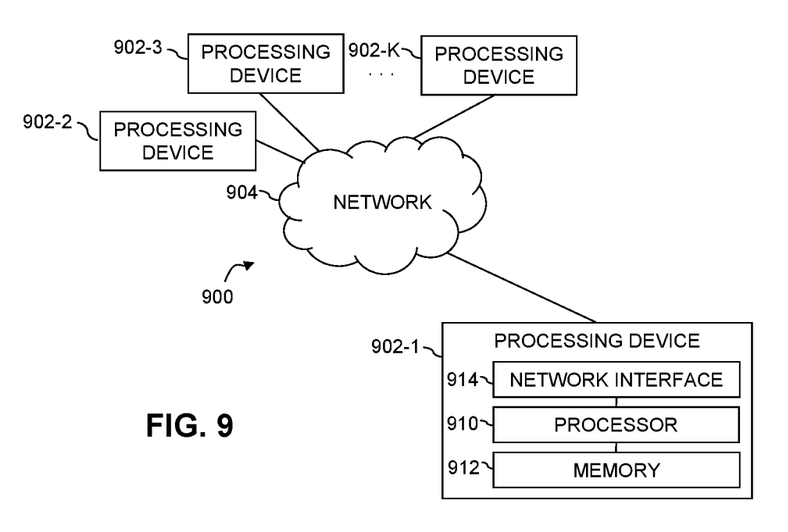
FIG. 9 illustrates another exemplary processing platform that may be used to implement at least a portion of one or more embodiments of the invention.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "computer program product" having executable computer program code embodied therein, may comprise random access memory (RAM), read only memory (ROM) or other types of memory, in any combination.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
   obtaining multi-channel heterogeneous data from a plurality of channels, wherein said plurality of channels comprise at least two of social media channels, call center channels, chat channels, email channels and an Internet channel;
   aggregating said multi-channel heterogeneous data from said plurality of channels into a data lake;
   identifying one or more target entities that are targets of opinion information across said plurality of channels;
   extracting a plurality of user identities from said plurality of channels;
   aligning, using at least one processing device of said data lake, said plurality of extracted user identities across said plurality of channels to link common user identities;
   identifying, using the at least one processing device of said data lake, one or more of said target entities that are targets of said opinion information of said extracted user identities;
   linking, using the at least one processing device of said data lake, said opinion information of said extracted user identities with a linked common user identity associated with an opinion holder that expressed said opinion information;
   determining, using the at least one processing device of said data lake, a sentiment classification of said opinion information indicating whether said opinion information of said opinion holder comprises one or more of a positive opinion and a negative opinion by identifying subjective information within said opinion information and applying a trained classifier to said subjective information to determine said sentiment classification, wherein said trained classifier is trained by applying a supervised learning technique to a training dataset having labeled sentiment classifications;
   clustering, using the at least one processing device of said data lake, a plurality of linked common user identities into a plurality of node clusters such that each node cluster comprises a plurality of linked common user identities expressing opinion information about related target entities;
   providing, using the at least one processing device of said data lake, a summary of a plurality of said opinion information of at least one opinion holder having an associated linked common user identity across said plurality of channels with respect to said one or more target entities; and
   initiating, using the at least one processing device of said data lake, a communication to at least one of said linked common user identities in a given node cluster based at least in part on an evaluation of one or more of a frequency of said opinion information and said sentiment classification of said opinion information.

2. The method of claim 1, further comprising the step of distinguishing said opinion information from factual information.

3. The method of claim 1, wherein said step of determining said sentiment classification indicating whether said opinion information of said opinion holder comprises one or more of said positive opinion and said negative opinion further comprises the step of applying one or more sentiment polarity classification algorithms to said opinion information, wherein said one or more sentiment classification algorithms comprise one or more of: (i) a lexicon-based classifier that determines said sentiment classification of said opinion information by identifying one or more synonyms of said opinion information and assigns a sentiment classification of said one or more synonyms as said sentiment classification of said opinion information; and (ii) a statistical classifier that evaluates mutual word information between words of said opinion information and one or more paradigm words having a known sentiment classification.

4. The method of claim 1, wherein said step of determining said sentiment classification indicating whether said opinion information of said opinion holder comprises one or more of said positive opinion and said negative opinion further comprises the step of assigning a polarity score to said opinion information.

5. The method of claim 1, further comprising the step of providing an influencer score of said given opinion holder with said summary.

6. The method of claim 1, further comprising the step of repeating said method to identify one or more of new opinion holders and new entities.

7. The method of claim 1, further comprising the step of contacting said given opinion holder based on said summary.

8. The method of claim 1, wherein the summary of the plurality of said opinion information of the given opinion holder is used to profile the given opinion holder for one or more customer-centric businesses.

9. A computer program product, comprising a tangible machine-readable storage medium having encoded therein executable code of one or more software programs, wherein the one or more software programs when executed by at least one processing device perform the following steps:
obtaining multi-channel heterogeneous data from a plurality of channels, wherein said plurality of channels comprise at least two of social media channels, call center channels, chat channels, email channels and an Internet channel;
aggregating said multi-channel heterogeneous data from said plurality of channels into a data lake;
identifying one or more target entities that are targets of opinion information across said plurality of channels;
extracting a plurality of user identities from said plurality of channels;
aligning, using at least one processing device of said data lake, said plurality of extracted user identities across said plurality of channels to link common user identities;
identifying, using the at least one processing device of said data lake, one or more of said target entities that are targets of said opinion information of said extracted user identities;
linking, using the at least one processing device of said data lake, said opinion information of said extracted user identities with a linked common user identity associated with an opinion holder that expressed said opinion information;
determining, using the at least one processing device of said data lake, a sentiment classification of said opinion information indicating whether said opinion information of said opinion holder comprises one or more of a positive opinion and a negative opinion by identifying subjective information within said opinion information and applying a trained classifier to said subjective information to determine said sentiment classification, wherein said trained classifier is trained by applying a supervised learning technique to a training dataset having labeled sentiment classifications;
clustering, using the at least one processing device of said data lake, a plurality of linked common user identities into a plurality of node clusters such that each node cluster comprises a plurality of linked common user identities expressing opinion information about related target entities;
providing, using the at least one processing device of said data lake, a summary of a plurality of said opinion information of at least one opinion holder having an associated linked common user identity across said plurality of channels with respect to said one or more target entities; and
initiating, using the at least one processing device of said data lake, a communication to at least one of said linked common user identities in a given node cluster based at least in part on an evaluation of one or more of a frequency of said opinion information and said sentiment classification of said opinion information.

10. The computer program product of claim 9, further comprising the step of distinguishing said opinion information from factual information.

11. The computer program product of claim 9, wherein said step of determining said sentiment classification indicating whether said opinion information of said opinion holder comprises one or more of said positive opinion and said negative opinion further comprises the step of applying one or more sentiment polarity classification algorithms to said opinion information, wherein said one or more sentiment classification algorithms comprise one or more of: (i) a lexicon-based classifier that determines said sentiment classification of said opinion information by identifying one or more synonyms of said opinion information and assigns a sentiment classification of said one or more synonyms as said sentiment classification of said opinion information; and (ii) a statistical classifier that evaluates mutual word information between words of said opinion information and one or more paradigm words having a known sentiment classification.

12. The computer program product of claim 9, wherein said step of determining said sentiment classification indicating whether said opinion information of said opinion holder comprises one or more of said positive opinion and said negative opinion further comprises the step of assigning a polarity score to said opinion information.

13. The computer program product of claim 9, further comprising the step of providing an influencer score of said given opinion holder with said summary.

14. The computer program product of claim 9, wherein the summary of the plurality of said opinion information of the given opinion holder is used to profile the given opinion holder for one or more customer-centric businesses.

15. A system, comprising:
a memory; and
at least one processing device, coupled to the memory, operative to implement the following steps:
obtaining multi-channel heterogeneous data from a plurality of channels, wherein said plurality of channels comprise at least two of social media channels, call center channels, chat channels, email channels and an Internet channel;
aggregating said multi-channel heterogeneous data from said plurality of channels into a data lake;
identifying one or more target entities that are targets of opinion information across said plurality of channels;
extracting a plurality of user identities from said plurality of channels;
aligning, using at least one processing device of said data lake, said plurality of extracted user identities across said plurality of channels to link common user identities;

identifying, using the at least one processing device of said data lake, one or more of said target entities that are targets of said opinion information of said extracted user identities;

linking, using the at least one processing device of said data lake, said opinion information of said extracted user identities with a linked common user identity associated with an opinion holder that expressed said opinion information;

determining, using the at least one processing device of said data lake, a sentiment classification of said opinion information indicating whether said opinion information of said opinion holder comprises one or more of a positive opinion and a negative opinion by identifying subjective information within said opinion information and applying a trained classifier to said subjective information to determine said sentiment classification, wherein said trained classifier is trained by applying a supervised learning technique to a training dataset having labeled sentiment classifications;

clustering, using the at least one processing device of said data lake, a plurality of linked common user identities into a plurality of node clusters such that each node cluster comprises a plurality of linked common user identities expressing opinion information about related target entities;

providing, using the at least one processing device of said data lake, a summary of a plurality of said opinion information of at least one opinion holder having an associated linked common user identity across said plurality of channels with respect to said one or more target entities; and initiating, using the at least one processing device of said data lake, a communication to at least one of said linked common user identities in a given node cluster based at least in part on an evaluation of one or more of a frequency of said opinion information and said sentiment classification of said opinion information.

16. The system of claim 15, further comprising the step of distinguishing said opinion information from factual information.

17. The system of claim 15, wherein said step of determining said sentiment classification indicating whether said opinion information of said opinion holder comprises one or more of said positive opinion and said negative opinion further comprises the step of applying one or more sentiment polarity classification algorithms to said opinion information, wherein said one or more sentiment classification algorithms comprise one or more of: (i) a lexicon-based classifier that determines said sentiment classification of said opinion information by identifying one or more synonyms of said opinion information and assigns a sentiment classification of said one or more synonyms as said sentiment classification of said opinion information; and (ii) a statistical classifier that evaluates mutual word information between words of said opinion information and one or more paradigm words having a known sentiment classification.

18. The system of claim 15, wherein said step of determining said sentiment classification indicating whether said opinion information of said opinion holder comprises one or more of said positive opinion and said negative opinion further comprises the step of assigning a polarity score to said opinion information.

19. The system of claim 15, further comprising the step of providing an influencer score of said given opinion holder with said summary.

20. The system of claim 15, wherein the summary of the plurality of said opinion information of the given opinion holder is used to profile the given opinion holder for one or more customer-centric businesses.

* * * * *